US009438769B1

(12) United States Patent
Fan

(10) Patent No.: US 9,438,769 B1
(45) Date of Patent: Sep. 6, 2016

(54) PRESERVING SMOOTH-BOUNDARIED OBJECTS OF AN IMAGE

(71) Applicant: Hewlett-Packard Development Company, L.P., Houston, TX (US)

(72) Inventor: Jian Fan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/806,923

(22) Filed: Jul. 23, 2015

(51) Int. Cl.
G06K 9/40 (2006.01)
H04N 1/407 (2006.01)
H04N 1/58 (2006.01)
H04N 1/40 (2006.01)

(52) U.S. Cl.
CPC ........ H04N 1/4072 (2013.01); H04N 1/40068 (2013.01); H04N 1/58 (2013.01); *H04N 2201/0081* (2013.01)

(58) Field of Classification Search
CPC ........... G06T 5/001; G06T 5/20; G06T 5/40; G06T 5/50; G06T 7/0083; G06T 2207/20144; G06T 5/003
See application file for complete search history.

(56) References Cited

U.S. PATENT DOCUMENTS

| 5,572,565 | A | * | 11/1996 | Abdel-Mottaleb ... G06T 7/0012 378/37 |
| 5,778,092 | A | | 7/1998 | MacLeod et al. |
| 5,825,910 | A | * | 10/1998 | Vafai .................... G06T 7/0083 378/37 |
| 7,027,643 | B2 | * | 4/2006 | Comaniciu ............. G06K 9/42 382/162 |
| 7,324,120 | B2 | * | 1/2008 | Curry ................. G06K 9/00456 345/611 |
| 7,730,406 | B2 | | 6/2010 | Chen |
| 7,903,141 | B1 | | 3/2011 | Mariano et al. |
| 8,059,892 | B1 | | 11/2011 | Fan |
| 8,306,283 | B2 | * | 11/2012 | Zhang ..................... G06T 5/003 385/118 |
| 8,417,033 | B2 | | 4/2013 | Fan |
| 8,594,439 | B2 | | 11/2013 | Staelin et al. |
| 8,693,780 | B2 | | 4/2014 | Tal et al. |
| 8,724,919 | B2 | * | 5/2014 | Pillman .................. G06T 5/003 382/173 |
| 2013/0243313 | A1 | * | 9/2013 | Civit ...................... G06T 5/002 382/164 |

FOREIGN PATENT DOCUMENTS

CN 101833764 A 9/2010

OTHER PUBLICATIONS

Fan, Jian, "Robust Color Image Enhancement of Digitized Books", 2009 10th International Conference on Document Analysis and Recognition, IEEE, 2009, 561-565.
Zaharescu, A., "Multi-scale Multi-feature Codebook-based Background Subtraction", Nov. 6-13, 2011, 1753-1760.

* cited by examiner

*Primary Examiner* — Amir Alavi
(74) *Attorney, Agent, or Firm* — Law Office of Robert C. Sismilich

(57) ABSTRACT

In one example, a method of automatically enhancing a digital image having a smooth-boundaried foreground object. The method processes the image via gradient-based background segmentation at a first scale to generate a first mask. The first mask has a first accuracy. The first mask is used to generate a first background of the image which includes at least a portion of the smooth-boundaried foreground object. The method further processes the first background via gradient-based background segmentation at a smaller second scale to generate a second mask. The second mask has a greater second accuracy. The second mask is used with the first mask to generate a second background of the image which substantially excludes the smooth-boundaried foreground object. The image can be enhanced using the second background so as to preserve the smooth-boundaried foreground object.

9 Claims, 12 Drawing Sheets

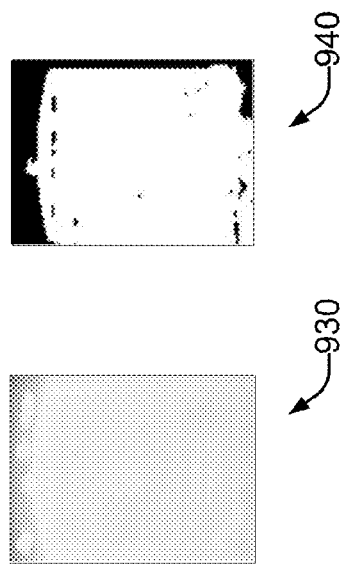
FIG. 9D
FIG. 9E
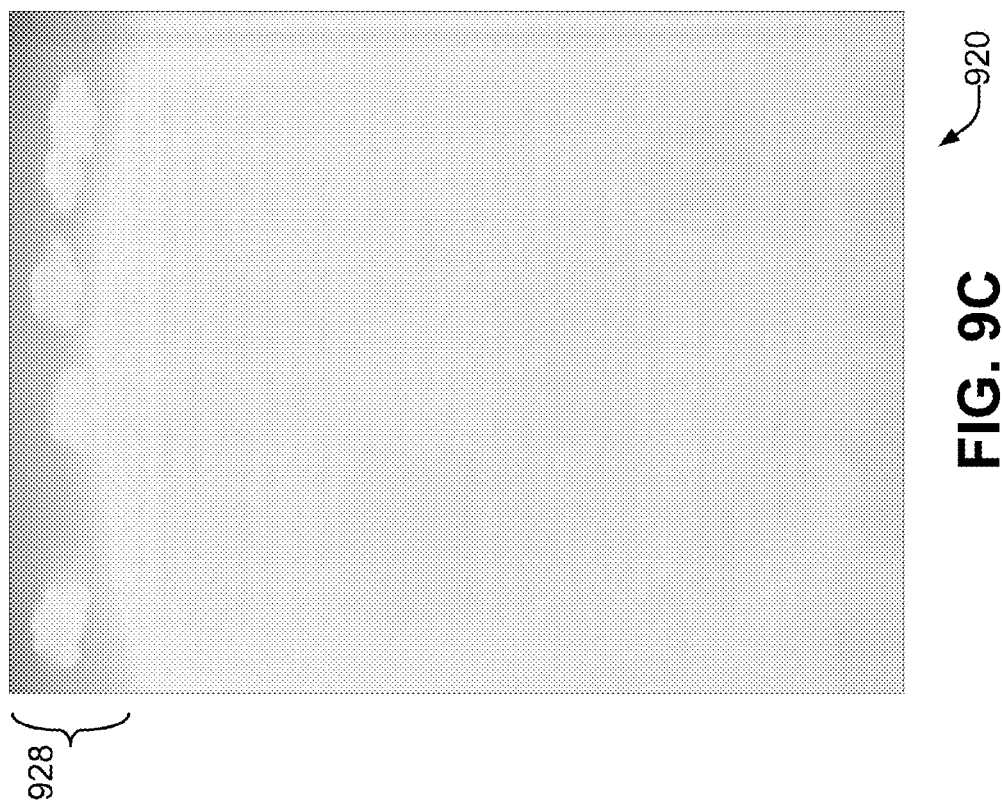
FIG. 9C

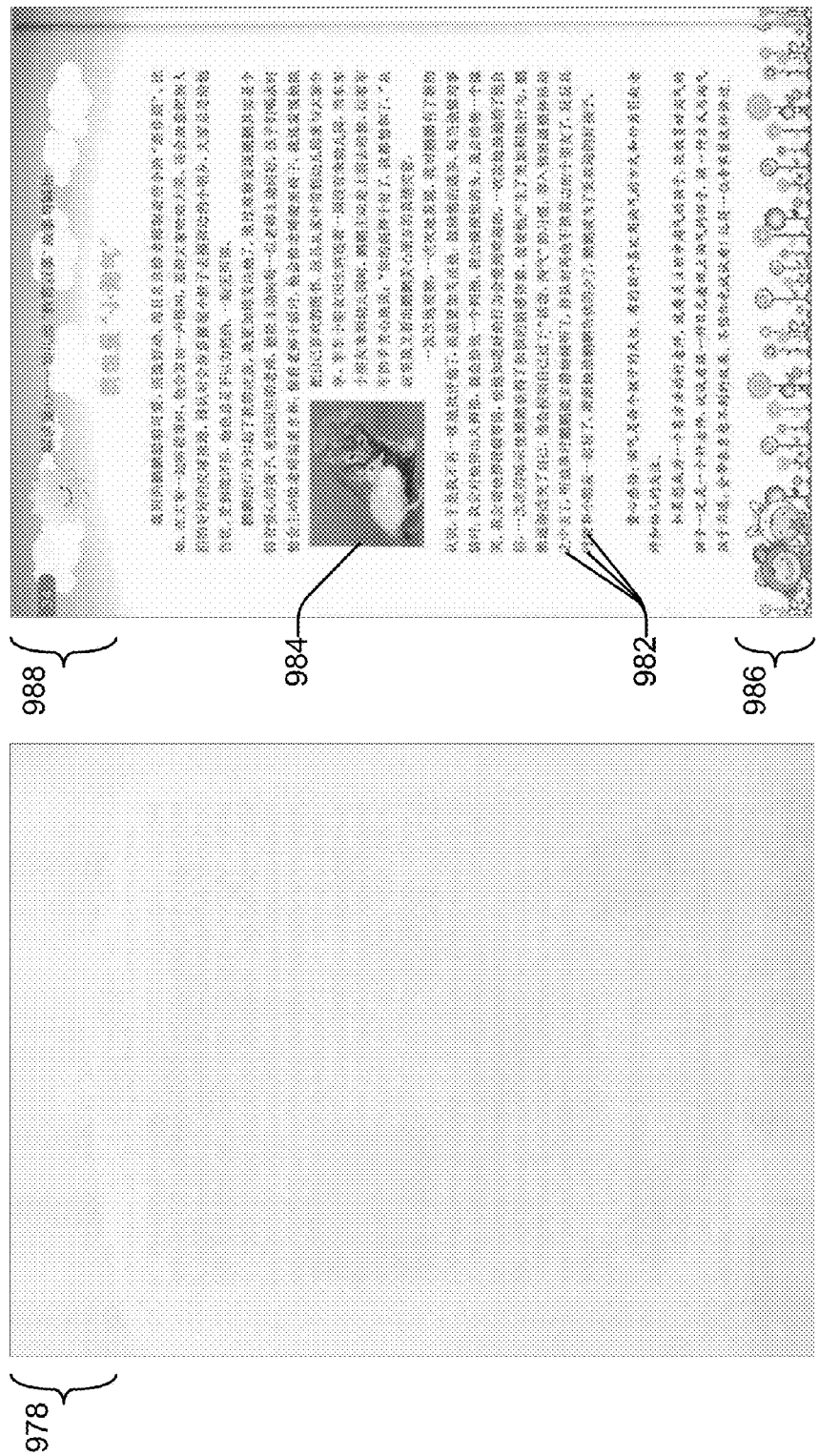

PRESERVING SMOOTH-BOUNDARIED OBJECTS OF AN IMAGE

BACKGROUND

Digital images of a document captured by an imaging device may exhibit certain defects in image quality. Consider, for example, a camera-based imaging device used to capture images of book pages. A camera can advantageously capture images of book pages without destroying the book by removing its pages, as would otherwise be done in order to sheet-feed the individual pages into an image scanner. However, the images captured by a camera may be unevenly illuminated by the light source, and may exhibit a color cast (color shift) if the color temperature of the light source does not match that expected by the camera. Furthermore, while the background of printed pages is generally expected to be uniformly white in color, the paper of an older book, as well as older non-book document sheets, may be discolored due to aging effects, causing a further color cast in the captured images.

BRIEF DESCRIPTION OF THE DRAWINGS

FIG. 9C is a schematic depiction of an example first background image (background), at the working scale, generated from the example digital image of FIG. 9A and the example first background mask of FIG. 9B in accordance with an example of the present disclosure using the methods of the flowcharts of FIGS. 1-5 and/or the devices of FIGS. 6-8.

FIG. 9D is a schematic depiction of an example downscaled first background image, at a sub-scale, generated from the first background of FIG. 9C in accordance with an example of the present disclosure using the methods of the flowcharts of FIGS. 1-5 and/or the devices of FIGS. 6-8.

FIG. 9E is a schematic depiction of an example downscaled second mask (background mask), at the sub-scale, generated from the example downscaled first background image of FIG. 9D in accordance with an example of the present disclosure using the methods of the flowcharts of FIGS. 1-5 and/or the devices of FIGS. 6-8.

FIG. 9H is a schematic depiction of an example second background image (background), at the original scale, generated from the example digital image of FIG. 9A and the example composite mask of FIG. 9G in accordance with an example of the present disclosure using the methods of the flowcharts of FIGS. 1-5 and/or the devices of FIGS. 6-8.

FIG. 9I is a schematic depiction of an example enhanced digital image, at the original scale, generated from the example digital image of FIG. 9A, using the example composite mask of FIG. 9G and the example second background image of FIG. 9H, in accordance with an example of the present disclosure using the methods of the flowcharts of FIGS. 1-5 and/or the devices of FIGS. 6-8.

DETAILED DESCRIPTION

Figure 1:
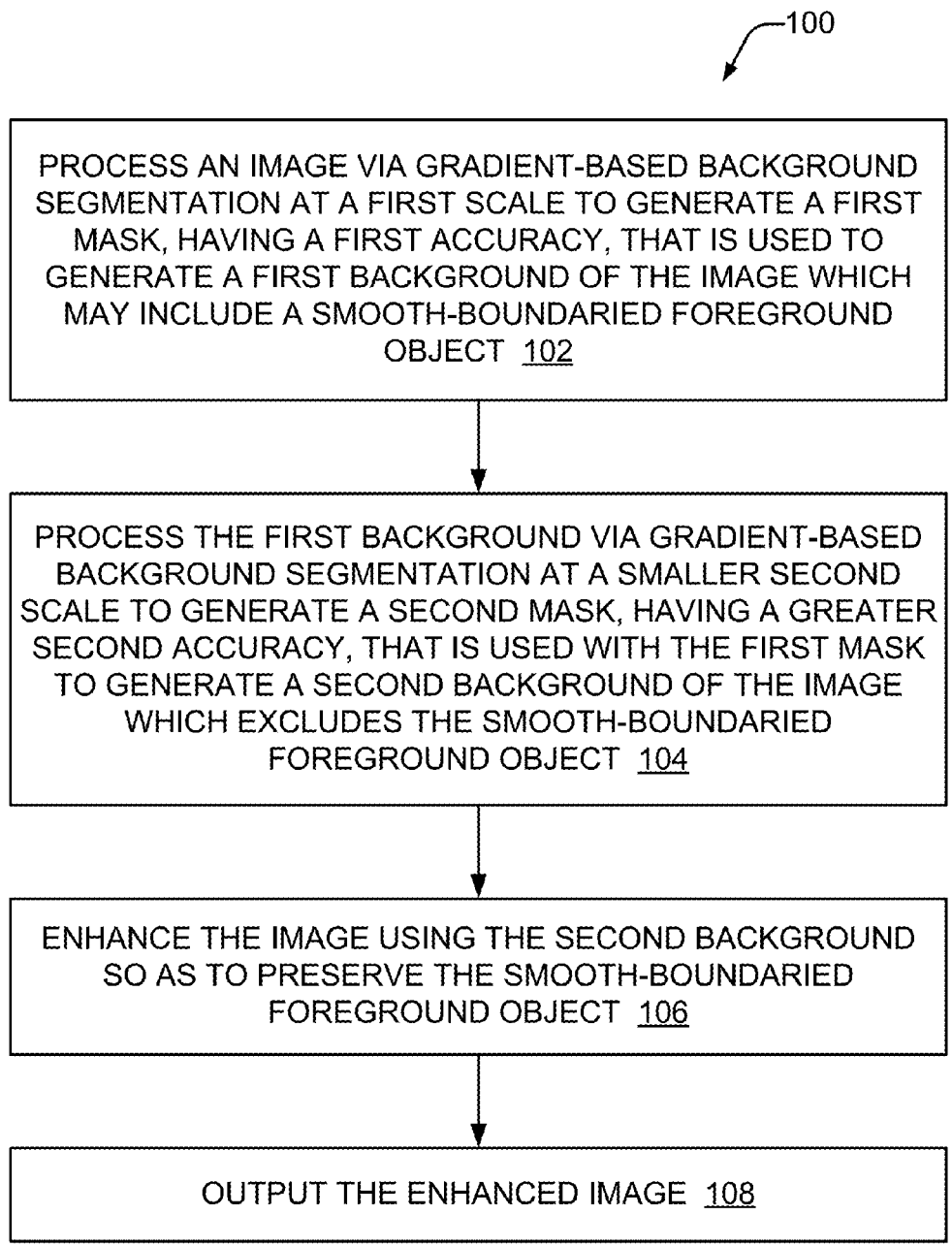
FIG. 1 is a flowchart in accordance with an example of the present disclosure of a method of enhancing a digital image having a smooth-boundaried foreground object.

It is desirable to have an ability to automatically enhance digital images which have quality defects, in order to increase their image quality. One class of such images is camera-acquired images, such as images of book pages or other documents having textual and pictorial objects positioned at particular regions of a generally white background. Regions of the image which correspond to the textual and pictorial objects may be considered as non-background (foreground) regions, with the remainder of the image considered as background regions.

One method of automatic image enhancement separates, or segregates, the pixels of the image into background pixels for background regions of the image, and non-background (or foreground) pixels for non-background regions of the image. This may be done as a preliminary step in modifying the image to increase its visual quality. One technique for separating the pixels is gradient-based background segmentation. This technique operates by determining the gradient (the amount of change), between adjacent or nearby pixels, in at least one pixel characteristic. One such characteristic may be pixel luminance. However, a gradient-based background segmentation technique may fail to accurately identify foreground objects which have smooth-boundaries. Such misidentification can occur because a smooth boundary produces a weak gradient that is insufficient to distinguish the smooth-boundaried foreground object pixels from the surrounding background pixels. As a result, at least a portion of a smooth-boundaried foreground object may be incorrectly identified as a background region, rather than as a non-background region. This incorrect region identification may in turn cause undesirable visual artifacts to appear in the image after it is enhanced. For example, the portion of a smooth-boundaried foreground object which is denoted as a background region can be undesirably removed from the enhanced image. In such cases, the "enhanced" image may actually have poorer image quality than the original unenhanced image. As a result of this concern, images having smooth-boundaried foreground elements may be left for manually image editing, a tedious and time-consuming operation, particularly when it is to be performed on a large set of images, such as pages of a book.

One core concept of the present disclosure provides a significant advance in the technology of automatic image enhancement of digital document images, particularly images which include smooth-boundaried foreground elements. The methods and devices of the present disclosure enable automatic image enhancement to be performed on such images without introducing undesirable image quality artifacts, thus saving considerable time, and avoiding human error, associated with manual image editing.

Referring now to the drawings, there are illustrated various examples, in accordance with the present disclosure, of methods and devices which can automatically enhance a digital image having a smooth-boundaried foreground object.

Considering one method of enhancing a digital image having a smooth-boundaried foreground object, and with reference to FIG. 1, a method 100 begins, at 102, by processing the image via, inter alia, gradient-based background segmentation to generate a first mask (also referred to as a "background mask"). The first mask is then used to generate a first background of the image. A "background" (also referred to as a "background image") is a representation of an image in which regions identified as non-background regions (i.e. those representing foreground object(s) are filled in ("inpainted") based on the background regions. Doing so has the effect of removing the foreground object(s) from the background image Conceptually, the background image is the blank page of a document or book onto which the text and pictures are added, and generating a background is conceptually like lifting the foreground images off the blank page.

Figure 2:
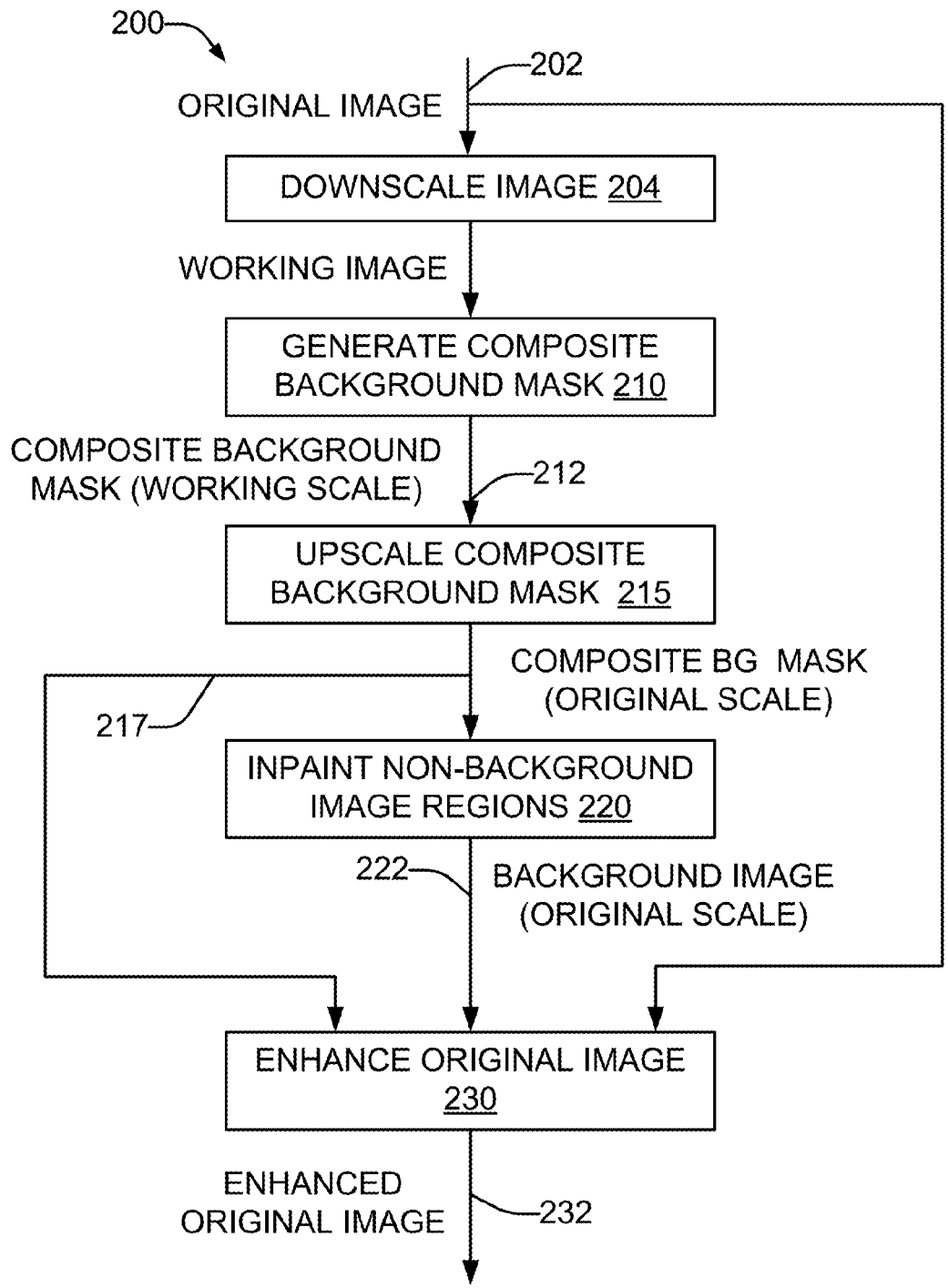
FIG. 2 is a flowchart in accordance with an example of the present disclosure of another method of enhancing a digital image having a smooth-boundaried foreground object.

The image that is processed at 102 is of a first scale (or size); that is, the pixels of the image are arranged in rows having a first width, and columns having a first height. This image, as described subsequently with reference to FIG. 2, is downscaled, in some examples, from an original size (or native size) to a working size prior to 102 if the original size is larger than the working size, and the working image is processed at 102. The first mask, and the first background, which are generated from the image at 102 are at the same scale as the image. The first mask may improperly denote at least a portion of the smooth-boundaried foreground region of the image as being a background region instead. As a result, when the first mask is used to generate the first background, at least a portion of the smooth-boundaried foreground region is included in the background. A highly-accurate background would not include any portion of a smooth-boundaried foreground region. Thus the first mask has a lower first accuracy. The term "accuracy" refers to the degree of correctness with which the pixels of the smooth-boundaried foreground object, as well as the pixels of the other foreground objects, are identified by the mask as belonging to a non-background region of the image. It may also refer to the degree of correctness with which the pixels of foreground objects are excluded from a background generated using the mask.

At 104, the method 100 processes the first background via, inter alia, gradient-based background segmentation to generate a second mask. The second mask is used with the first mask to generate a second (final) background of the image. In some examples, this includes merging the second mask and the first mask to form a composite mask which is then used to generate the second background. The composite mask denotes foreground and background regions of the image with a high degree of accuracy, and as a result the second background excludes the smooth-boundaried foreground region of the image with a high degree of accuracy. Thus the composite mask has a higher (greater) second accuracy that is more accurate than the first accuracy.

The segmentation of the first background at block 104 is performed at a second scale which is smaller than the first scale. To do so, the first background is downscaled by a certain percentage before it is segmented. Downscaling the background reduces its size—i.e. it reduces the number of pixels in each row and column to rows of a second width and columns of a second height, where the second width is smaller than the first width and the second height is smaller than the first height. The number of pixels in both rows and columns are reduced by the same percentage.

At 106, the method 100 enhances the image using the second background so as to preserve the smooth-boundaried foreground object. Examples of the various processing operations of 102-106 are discussed in greater detail with reference to FIGS. 2-5.

Figures 9A, 9B:
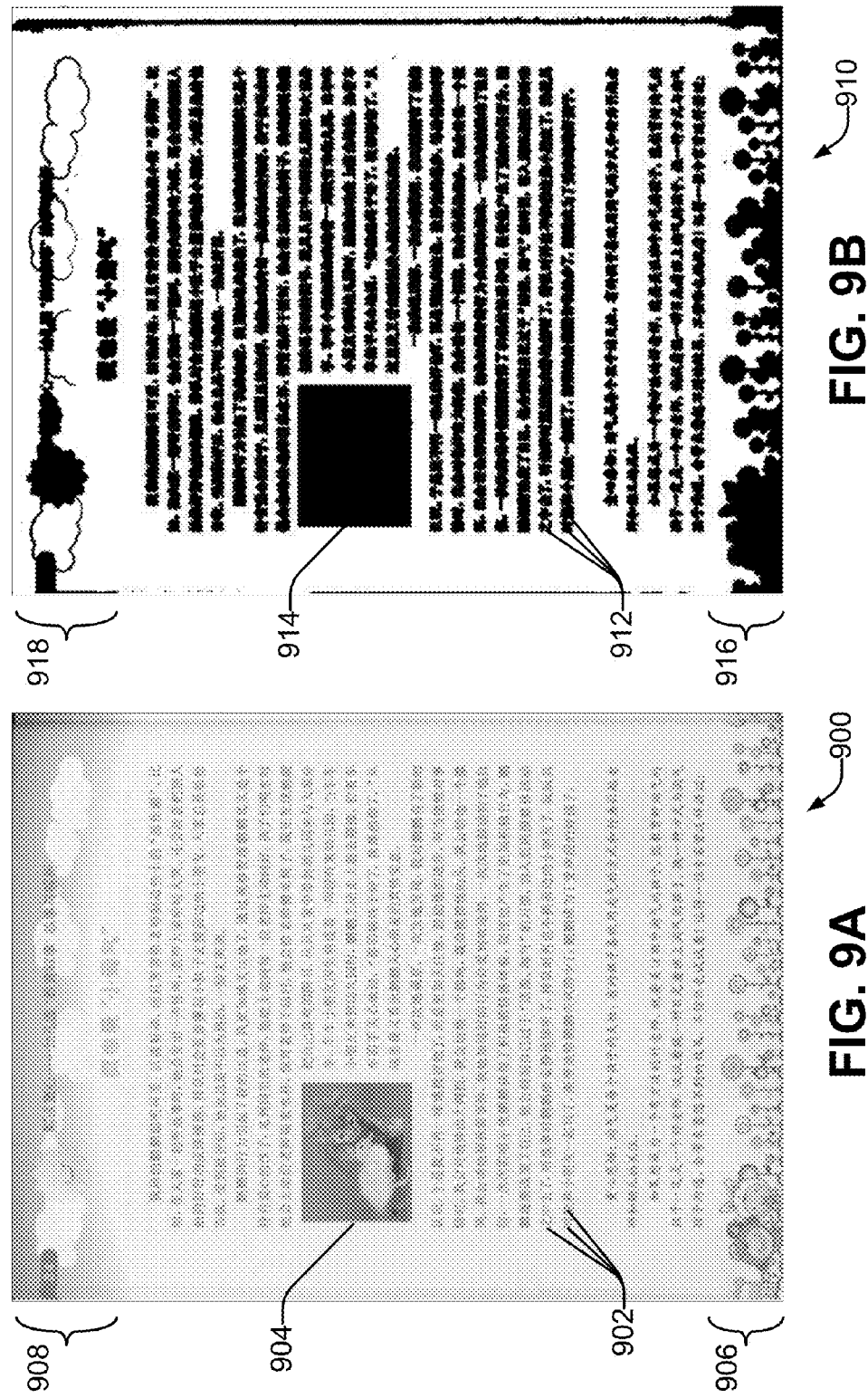
FIG. 9A is a schematic depiction of an example digital image, at either an original scale or a working scale, in accordance with an example of the present disclosure using the methods of the flowcharts of FIGS. 1-5 and/or the devices of FIGS. 6-8.
FIG. 9B is a schematic depiction of an example first mask (image mask), at the working scale, generated from the example digital image of FIG. 9A in accordance with an example of the present disclosure using the methods of the flowcharts of FIGS. 1-5 and/or the devices of FIGS. 6-8.

FIGS. 9A through 9I are schematic depictions of various stages of the enhancement of an example digital image, and illustrate the operation and effect of blocks 102-106. To more readily perceive the boundaries of the image at each of these stages, each of the images includes a thin border which is not part of the image itself but merely used for clarity of illustration. The example input image 900 (FIG. 9A) includes, as foreground objects, text 902; a sharp-boundaried picture 904; sharp-boundaried flowers in a lower border 906; and smooth-boundaried clouds in an upper border 908. The image 900 is processed at 102 to generate the first background 920 (FIG. 9C). While the text 902 and the sharp-boundaried objects 904, 906 have been removed from the background 920, at least some portions of the smooth-boundaried clouds 908 in the image 900 undesirably remain in the upper border 928 of the background 920. This results from misidentification of those portions of the smooth-boundaried clouds 908 as background regions of the image 900, rather than as non-background regions; in other words, foreground objects of sharp boundaries of the image 900 have been excluded from the first background 920 with a lower first accuracy.

The background 920 is then processed at 104 to generate the second mask 940 (FIG. 9E), which is used along with the first mask 920 to generate the more accurate second background 970 (FIG. 9H). The smooth-boundaried clouds 908 in the image 900, which are present in the first background 920, are absent from the more accurate second background 970. This indicates a more accurate identification in the second background 970 of the smooth-boundaried clouds 908 as being foreground regions of the image 900 instead of background regions. The foreground objects of the image 900 have thus been excluded from the second background 970 with a higher second accuracy. The more accurate second background 970 is usable to preserve the smooth-boundaried clouds 908 during image enhancement at 106, which results in the enhanced image 980 (FIG. 9I).

A comparison of the image 900 and the enhanced image 980 illustrates the effectiveness of the enhancement, and the accuracy with which smooth-boundaries foreground objects in the image 900 are preserved in the enhanced image 980. The original image 900 has a color cast (a grayish background), and uneven illumination (the background regions are lighter near the top border region and darker near the bottom border region). In the original image 900, the text 902, picture 904, and lower border flowers 906 are lighter and have lower contrast with the background. However, in the enhanced image 980, the color cast and uneven illumination have been removed —the background is uniformly white. In addition, the text 982, picture 984, and lower border flowers 986 are darker and have higher contrast with the background. Furthermore, the smooth-boundaried upper border clouds 986 are accurately preserved in the enhanced image 980.

At 108, the method 100 outputs the enhanced image. In one example, the enhanced image is output by saving it to a memory. In another example, the enhanced image is output by printing a hard copy of it.

Considering now another method of enhancing a digital image having a smooth-boundaried foreground object, and with reference to FIG. 2, a method 200 receives an original digital image 202 and an original scale (or native scale). The original image 202 is of an original size, having R pixels per row and C pixels per column. At 204, the original image 202 is downscaled to a smaller working image 206, at a working scale, having r pixels per row and c pixels per column. The working image 206 has a predefined largest dimension. In other words, the downscaling reduces the larger dimension of r or c to a predefined size, with the other dimension reduced proportionately. In one example, the predefined size is 800 pixels. A working image 206 of this size is sufficiently large to provide effective image enhancement, while advantageously minimizing the processing time and resources used. It also provides noise smoothing. At 210, a composite background mask (or composite mask) 212 is generated from the working image 206. The composite mask 212 is at the working scale. The composite mask 212 is a binary mask which identifies the background and non-background regions of the working image 206 with a high degree of accuracy, including locating smooth-boundaried foreground objects within non-background regions. At 215, the composite mask 212 is upscaled to form a composite mask 217 at the original scale. At 220, non-background regions of the original image 202 are inpainted based on the composite background mask 217 to generate a background image 222, at the original scale, from which smooth-boundaried foreground objects in the original image are absent. Examples of the composite mask generating operation 210, and the inpainting operation 220, are discussed subsequently in greater detail with reference to FIG. 3. At 230, the original image 202 is enhanced using the original-scale background image 222 and/or the original-scale composite mask 217 to form an enhanced original image 232 at the original scale.

The content of the example image 900 (FIG. 9A) corresponds to both the original image 202 at the original scale, and the working image 206 at the working scale; they both have the same content but at different scales. The content of the example mask 960 (FIG. 9G) corresponds to both the composite background mask 212 (at the working scale) and the upscaled composite background mask 217 (at the original scale) for the example image 900; they both have the same content but at different scales. Image pixels of a background region are illustrated as white, and image pixels of a non-background region are illustrated in black. In the example composite background mask 960, the foreground objects of the image 900 are preserved as non-background (black) regions: the text 902 as text 962, the sharp-boundaried picture 904 as picture 964, the sharp-boundaried flowers in the lower border 906 as flowers 966, and the smooth-boundaried clouds in the upper border 908. as clouds 968. The example background image 970 (FIG. 9H) illustrates the original-scale background image 222 for the example image 900. All the foreground objects—the smooth-boundaried clouds in the upper border 908, as well as the text 902, sharp-boundaried picture 904, sharp-boundaried flowers in the lower border 906—are absent from the background image 970. This results from using the accurate composite background mask 960 to generate the background image 970. However, the background image 970 retains the color cast and uneven illumination effects which are present in the original image 900. This background image 970 is used during the image enhancement 230 to eliminate these effects from the example enhanced image 980 (FIG. 9I).

Figure 3:
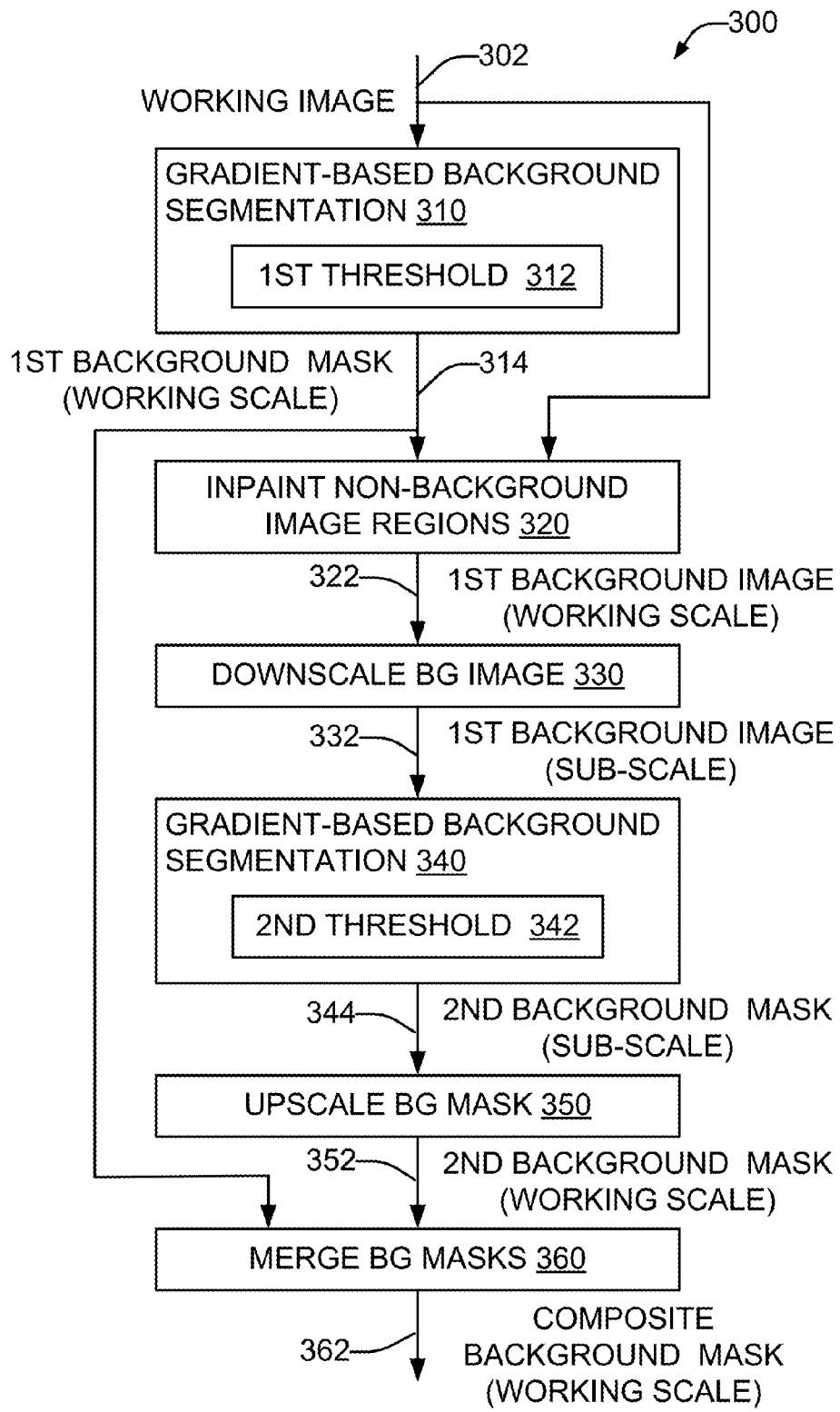
FIG. 3 is a flowchart in accordance with an example of the present disclosure of a method of generating a composite background mask usable with the method of the flowchart of FIG. 2.

Considering now a method of generating a composite background mask, and with reference to FIG. 3, a method 300 generates a composite background mask 362 from a working image 302. The working image 302 has a first size which corresponds to a first scale (a working scale) of the image content. In one example, the working image 302 is the working image 206 (FIG. 2); the composite background mask 362 is the working-scale composite background mask 212 (FIG. 2); and the method 300 performs the generate composite mask operation 210 (FIG. 2). At 310, the working image 302 is segmented, via gradient-based background segmentation, to form a first mask 314, at the working scale, which identifies background and non-background regions of the image 302 with a lower, first accuracy. A first global threshold 312 is used in segmenting the working image 302.

Figure 4:
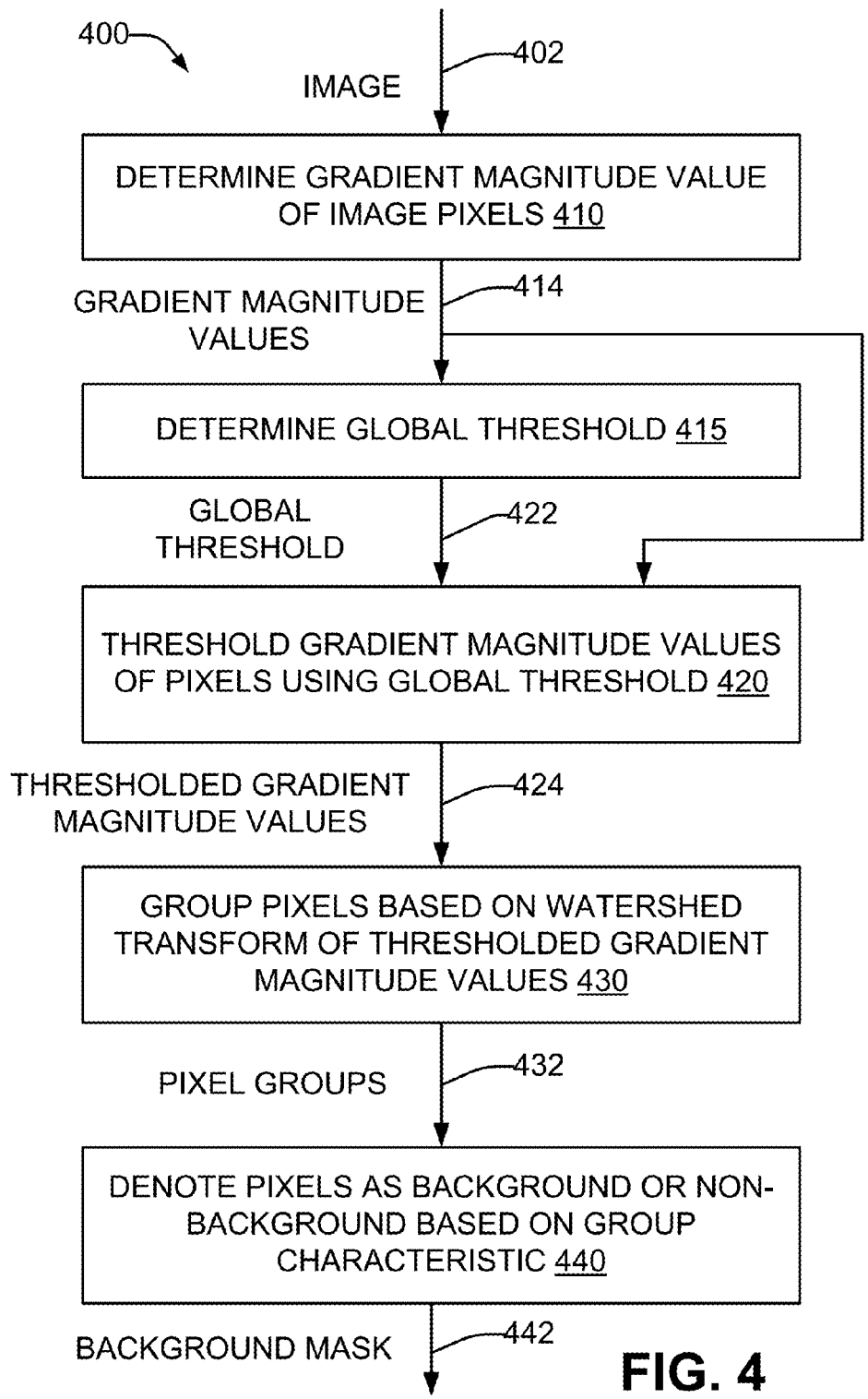
FIG. 4 is a flowchart in accordance with an example of the present disclosure of a method of gradient-based background segmentation usable with the method of the flowchart of FIG. 3.

In one example, and with reference to FIG. 4, the gradient-based background segmentation 310 is performed according to a method 400, where the image 400 is the working image 302, the global threshold 422 is the first threshold 312, and the background mask 442 is the first background mask 314. The method 400 begins, at 410, by determining gradient magnitude values 414 at respective pixels of a working image 402 of at least one characteristic of the pixels. A variety of gradient filters or operators may be used to determine the gradient magnitude values 414. If the image 402 is a grayscale image, the gradient magnitude values 414 may be determined using, for example, a basic derivative filter, a Prewitt gradient filter, a Sobel gradient filter, a Gaussian gradient filter, or another type of morphological gradient filter. If the image 402 is a color image, the image 402 may be converted into a grayscale image and then a gradient filter of the type listed above applied to the grayscale values to determine the gradient magnitudes 414. Alternatively, a color image 402 may be converted into a YCrCb color image and a gradient filter of the type listed above applied to the luminance (Y) values in order to determine the gradient magnitudes 414. In some examples, each of the gradient magnitude values 414 are computed from multiple color space components (e.g., red, green, and blue components) of the color image. In such examples, the magnitudes 414 of color gradients in the color image is determined in accordance with the color gradient operator described in Silvano DiZenzo, "A Note on the Gradient of a Multi-Image," Computer Vision, Graphics, and Image Processing, vol. 33, pages 116-125 (1986). While in some examples the gradient magnitude values 414 are directly determined from the pixel values of the image 402, in other examples the pixel values of the image 402 may be denoised with a denoising filter (such as, for example, a Gaussian smoothing filter and/or a bilateral smoothing filter) before determining the gradient magnitude values 414.

At 415, a global threshold value 422 ($\tau_{GLOBAL}$) is determined from the gradient magnitude values 414. In one example, the global threshold value 422 ($\tau_{GLOBAL}$) is empirically determined according to equation (1):

$$\tau_{GLOBAL} = \begin{cases} k \cdot g_{MAX} & \text{if } k \cdot g_{MAX} > \tau_{MIN} \\ \tau_{MIN} & \text{otherwise} \end{cases} \quad (1)$$

where k is a real number, $g_{MAX}$ is the maximum gradient magnitude value, and $\tau_{MIN}$ is an empirically determined minimum global threshold value. In some examples, the range of gradient magnitude values is from 0 to 255, k=0.1, and $\tau_{MIN}$=5. In another example, the global threshold value 422 ($\tau_{GLOBAL}$) is determined according to a histogram of the gradient magnitude values as described in Jian Fan, "Robust Color Enhancement of Digitized Books", 10th International Conference on Document Analysis and Recognition, ICDAR 2009, pages 561-565. The histogram may be constructed by quantizing gradient magnitude values into 256 levels, and counting the number of values falling into individual bins. Because it is assumed that the background regions are smooth and that they occupy the largest portion of a page, the gradient magnitudes of background regions constitute the highest peak in the histogram $_{gh}$. Based on this assumption, the threshold can be set by the tail of the curve beyond the peak. In yet another example, the global threshold value 422 ($\tau_{GLOBAL}$) is determined from the gradient magnitude values according to the method described in P. L. Rosin, "Unimodal Thresholding", Pattern Recognition, vol. 34(11), pages 2083-2096, 2001.

At 420, the gradient magnitude values 414 are thresholded using the global threshold 422 to form thresholded gradient magnitude values 424. This global thresholding operation may eliminate or break noise structures in the image 402 and thus reduce over-segmentation and/or inaccurate segmentation which may result from such noise structures.

At 430, the pixels are assigned to groups 432 based on a watershed transform of the thresholded gradient magnitude values. In the course of computing the watershed transform of the gradient magnitude values, basins and watersheds in the thresholded magnitude values are identified, respective basin labels are assigned to those pixels corresponding to ones of the identified basins, a unique shared label is assigned to those pixels which correspond to the watersheds, and a connected components analysis is performed on the assigned labels. The watershed transform may be computed in accordance with any of a wide variety of different methods. In some examples, the basins are found first and the watersheds may be found by taking a set complement. In other examples, the image 402 is partitioned completely into basins and the watersheds may be found by boundary detection (see, e.g., J. B. T. M. Roerdink et al., "The Watershed Transform: Definitions, Algorithms and Parallelization Strategies, Fundamenta Informaticae, vol. 41, pages 187-228 (2001)). In some examples, watershed transform of the thresholded gradient magnitude values is computed in accordance with the watershed calculation method described in Luc Vincent et al., "Watersheds in Digital Spaces: An Efficient Algorithm Based on Immersion Simulations," IEEE Transactions on Pattern Analysis and Machine Intelligence, vol. 13, no. 6 (June 1991). In general, any of a wide variety of different connected components analyses may be performed on the assigned labels. For example, in one connected component labeling approach, the labels assigned to the pixels are examined pixel-by-pixel in order to identify connected pixel regions (or "blobs", which are regions of adjacent pixels that are assigned the same label). For each given pixel, the label assigned to the given pixel is compared to the labels assigned to the neighboring pixels. The label assigned to the given pixel is changed or unchanged based on the labels assigned to the neighboring pixels. The number of neighbors examined and the rules for determining whether to keep the originally assigned label or to re-classify the given pixel depends on the measure of connectivity being used (e.g., 4-connectivity or 8-connectivity). In some examples, after the pixel connectivity analysis has been performed, the watershed pixels are merged with the neighboring region with the largest label number to produce a segmentation of the pixels of the image 402 into a final set of identified groups 432.

At 440, the groups 432 are denoted as background regions or non-background regions based on at least one characteristic of the corresponding group 432. In one example, the one of the groups 432 which is determined to be largest in size is denoted as a background region, and the pixels of this group are denoted as background pixels. The other groups 432 are denoted as non-background regions, and the pixels of these groups are denoted as non-background pixels. The largest group may be identified in a variety of different ways. In one example, the largest group is the group having the largest number of pixels. The background mask 442 records the region identifications. In one example, the background mask 442 is a binary image having the same row-and-column dimensions as the working image 402. The mask 442 assigns a first binary value (e.g., "1" or "white") to each of the pixels segmented into the largest group (i.e. the background region), and a second binary value (e.g., "0" or "black") to each of the pixels segmented into any of the other groups (i.e. the non-background regions).

Returning to FIG. 3, the method 300 continues at 320, where a first background (first background image) 322, at the working scale, is formed by inpainting (filling in, or overwriting) the non-background regions of the working image 302 based on the content of the background region of the working image 302. The first mask 314 defines those portions of the working image 302 which are the non-background regions, and that portion of the working image 302 which is the background region. In some examples, the inpainting is based on the pixels of the background region which are nearby the non-background region which is being inpainted. The values of the pixels of the non-background region may be estimated from the values of nearby pixels in the background region to smoothly fill the inpainted region. In one example, inpainting is performed in accordance with the method of potential surfaces described in S. D. Yanowitz et al., "A New Method for Image Segmentation", Computer Vision, Graphics, and Image Processing (now known as Graphical Models and Image Processing), vol. 46, no. 1 (April 1989), pp. 82-95. Through successive iterations of this algorithm, all pixels of non-background regions have their values determined. For each non-background pixel, its 4-neighbor residual value may be computed and updated independently for R, G, and B channels. The stopping condition may be based on the sum of absolute residues. The iteration may stop when the sum of absolute residues drops below a threshold that is set proportional to the total number of non-background pixels.

At 330, the first background 322 is downscaled to a size smaller than the working scale (i.e. a sub-scale) to form a downscaled first background 332 at the sub-scale. Downscaling the first background 322 makes a subsequent gradient-based background segmentation 340 of the downscaled background 332 more sensitive to smooth-boundaried foreground objects, such as the clouds in the border area 908 of the working image 302, by effectively increasing the gradient at smooth boundaries.

At 340, the downscaled (sub-scale) first background 332 is segmented, via gradient-based background segmentation, to form a downscaled (sub-scale) second mask 344. In one example, the gradient-based background segmentation 340 is performed according to the method 400 (FIG. 4), where the image 402 is the downscaled (sub-scale) first background 332, the global threshold 422 is the second threshold 342, and the background mask 442 is the downscaled (sub-scale) second background mask 344. The second global threshold 342 is used for segmenting the downscaled first background 332. The second global threshold 342 is determined at 415 from the gradient magnitude values (FIG. 4) and then reduced by a predetermined factor (40% in one example) to yield the threshold 422, which is used at 420 to threshold the gradient magnitude values. Although lowering the global threshold tends to result in over-segmentation of a given image, here the lower second threshold 342 is used to segment not the working image 302, but rather the downscaled (sub-scale) first background 332. Because many of the foreground objects—e.g. text and sharp-boundaried objects—have previously been removed from the downscaled first background 332, over-segmentation is mitigated. Beneficially, the second global threshold 342 makes the segmentation 340 more sensitive to smooth-boundaried foreground objects by setting a lower threshold for identifying non-background regions.

The downscaled (sub-scale) second mask 344 is a binary image similar to the first mask 314. As such, the downscaled second mask 344 has the same row-and-column dimensions as the downscaled (sub-scale) first background 332. Therefore, at 350, the second mask 344 is upscaled by the same factor that was previously used to downscale 330 the first background 322, in order to form an upscaled second mask 352 at the working scale. This makes the upscaled second mask 352 and the first mask 314 identical in size (i.e. in row and column dimensions). In examples where the upscaling 350 is performed using an interpolation method that results in a grayscale mask, the grayscale mask may be thresholded to reconvert it to a binary mask.

At 360, the first mask 314 and the second mask 352 are combined to form a composite background mask 362 which identifies background and non-background regions of the image 302 with a second accuracy that is greater than the first accuracy. In one example, the masks 314, 352 are merged. The composite mask 362 locates smooth-boundaried foreground objects and identifies them as non-background regions with a greater accuracy than the first mask 314. In one example, the combining 360 defines as a background region of the composite mask 362 the background regions of the first 314 and second 352 masks, and defines portions of the composite mask 362 other than the background region as non-background regions of the composite mask 362. In one example, a union operation combines each pixel ($B_1$) of the first mask 314 with the respective pixel ($B_2$) of the second mask 352 according to equation (2):

$$B_1 \cup B_2 = \begin{cases} 0, & \text{if } B_1 \equiv 0 \text{ or } B_2 \equiv 0 \\ 255, & \text{otherwise} \end{cases} \quad (2)$$

Figure 9G:
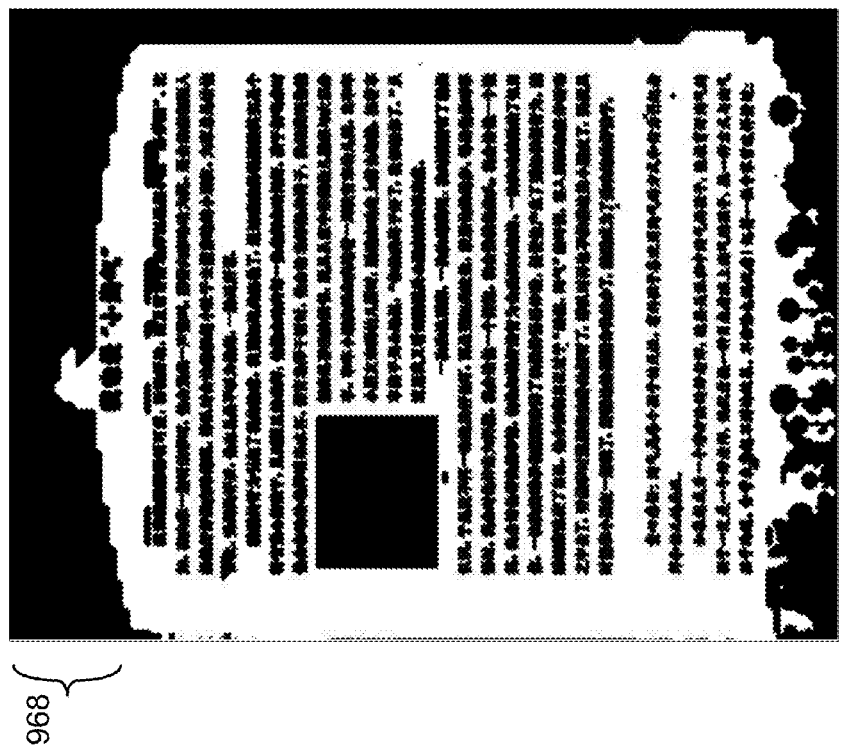
FIG. 9G is a schematic depiction of an example composite mask (composite background mask), at either the working scale or the original scale, generated from the example first mask of FIG. 9B and the example second mask of FIG. 9F in accordance with an example of the present disclosure using the methods of the flowcharts of FIGS. 1-5 and/or the devices of FIGS. 6-8.
Figure 9F:
FIG. 9F is a schematic depiction of an example second mask, at the working scale, upscaled from the example downscaled second mask of FIG. 9E in accordance with an example of the present disclosure using the methods of the flowcharts of FIGS. 1-5 and/or the devices of FIGS. 6-8.

The example first mask 910 (FIG. 9B) corresponds to the first mask 314 at the working scale. In the example first mask 910, the sharp-boundaried foreground objects (the text 902, the sharp-boundaried picture 904, and the sharp-boundaried flowers in the lower border 906 of FIG. 9A) are correctly denoted as non-background (black) regions (text 912, flowers 916, and flowers 916 respectively). However, large portions of the smooth-boundaried clouds in the upper border 908 (those portions of border 918 illustrated in white) have been misidentified as background regions. As a result, the example first background image 920 (FIG. 9C) generated using the first mask 910 includes a large portion of the foreground cloud objects 928. The first mask 910 would therefore yield an enhanced image of poor quality if image enhancement were to be performed according to the first mask 910. To remedy this, the second background segmentation 340 is performed at a lower scale than the first background segmentation 310. To do so, the example first background image 920 is downscaled 330 to form the example downscaled (sub-scale) background image 930 (FIG. 9D). The example downscaled (sub-scale) background image 930 is then segmented 340 to form the example downscaled (sub-scale) second mask 940 (FIG. 9E), which in turn is upscaled 350 (including thresholding if appropriate) to form the example second mask 950 (FIG. 9F) at the working scale. The example first mask 910 and the example second mask 950 are then combined to form the composite background mask 960 at the working scale (FIG. 9G). Relative to the example first mask 910, the example composite mask 960 properly identifies the smooth-boundaried clouds 908 as non-background regions at the upper border 968. The example composite mask 960 can be used to generate an enhanced image of high quality.

Figure 5:
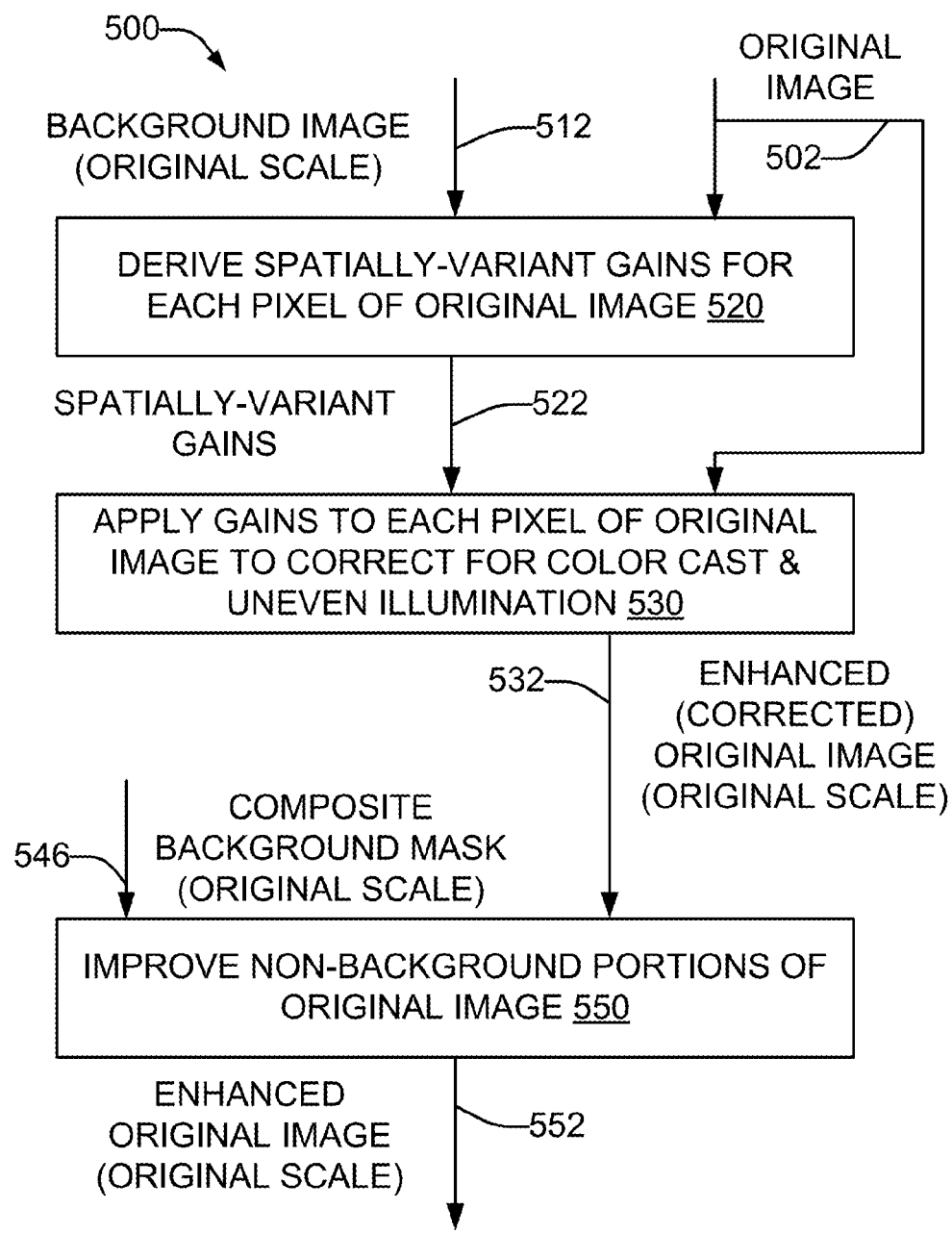
FIG. 5 is a flowchart in accordance with an example of the present disclosure of a method of enhancing an image using a background image and/or a composite background mask usable with the method of the flowchart of FIG. 2.

Considering now a method of enhancing an image using a background image and/or a composite background mask, and with reference to FIG. 5, a method 500 enhances an original image 502 at an original scale based on a background image 512 at the original scale, and/or a composite background mask 546 at the original scale. The background image 512 and background mask 546 are derived from, or associated with, the original image 502. In one example, the original image 502 is the original image 202 (FIG. 2); the background image 512 is the background image 222 (FIG. 2); the composite background mask 546 is the composite background mask 217 (FIG. 2); the enhanced original image 552 is the enhanced original image 232; and the method 500 performs the enhancing operation 230 (FIG. 2).

At 520, spatially-variant gains 522 for each pixel of the original image 502 are derived from the original-scale background image 512. The correction of uneven illumination and color cast may be achieved within the spatially-variant framework $\tilde{R}(x,y)=k_R(x,y)R(x,y)$, $\tilde{G}(x,y)=k_G(x,y)G(x,y)$, and $\tilde{B}(x,y)=k_B(x,y)B(x,y)$, where $k_R(x,y)$, $k_G(x,y)$, $k_B(x,y)$ are spatially-variant gains for the three color channels of the original image 502. In one example, the gains may be factored into a spatially-variant illumination component, and three spatially-invariant color coefficients. To estimate the gain functions, it is assumed that the background regions of the original image 502 were intended to be uniform white in color, with the canonical color of RGB=(255,255,255). The original-scale background image 512 is represented as a smooth color surface ($s_R(x,y)$, $s_G(x,y)$, $s_B(x,y)$). The gains 522 are computed on a pixel-by-pixel basis according to equation (3):

$$k_R(x,y)=255/s_R(x,y)$$

$$k_G(x,y)=255/s_G(x,y), \text{ and}$$

$$k_B(x,y)=255/s_B(x,y) \qquad (3)$$

At 530, the spatially-variant gains 522 are applied to each pixel of the original image 502 to form an enhanced original image 532, at the original scale, that corrects for the color cast and uneven illumination present in the original image 502.

At 550, portions of the enhanced original image 532 which correspond to non-background regions, as defined by the original-scale composite mask 546, are enhanced further to form an enhanced original image 552. The further enhancement is selective; portions of the enhanced original image 532 which correspond to background regions are not enhanced further at 550. The selective enhancement may include sharpening the non-background regions, darkening the non-background regions, and/or adjusting the contrast of the non-background regions. In some examples, these selective enhancements may be accomplished in accordance with methods described in U.S. Pat. No. 8,417,033, "Gradient Based Background Segmentation and Enhancement of Images", to Jian Fan.

While the method 500 both corrects and enhances the original image 502, in other examples one of these enhancements may be performed. If enhancement 550 of the non-background regions is omitted, then the corrected original image 532 becomes the enhanced original image 552. If correction 530 of the original image 502 is omitted, then the original image 502, rather than the enhanced original image 532, is supplied to block 550 and enhanced to form the enhanced original image 552.

The example image 900 (FIG. 9A) corresponds to the original image 502; the example composite background mask 960 (FIG. 9G) corresponds to the composite background mask 546; the example background image 970 (FIG. 9H) corresponds to the background image 512; and the example enhanced image 980 (FIG. 9I) corresponds to the enhanced original image 552.

Figure 6:
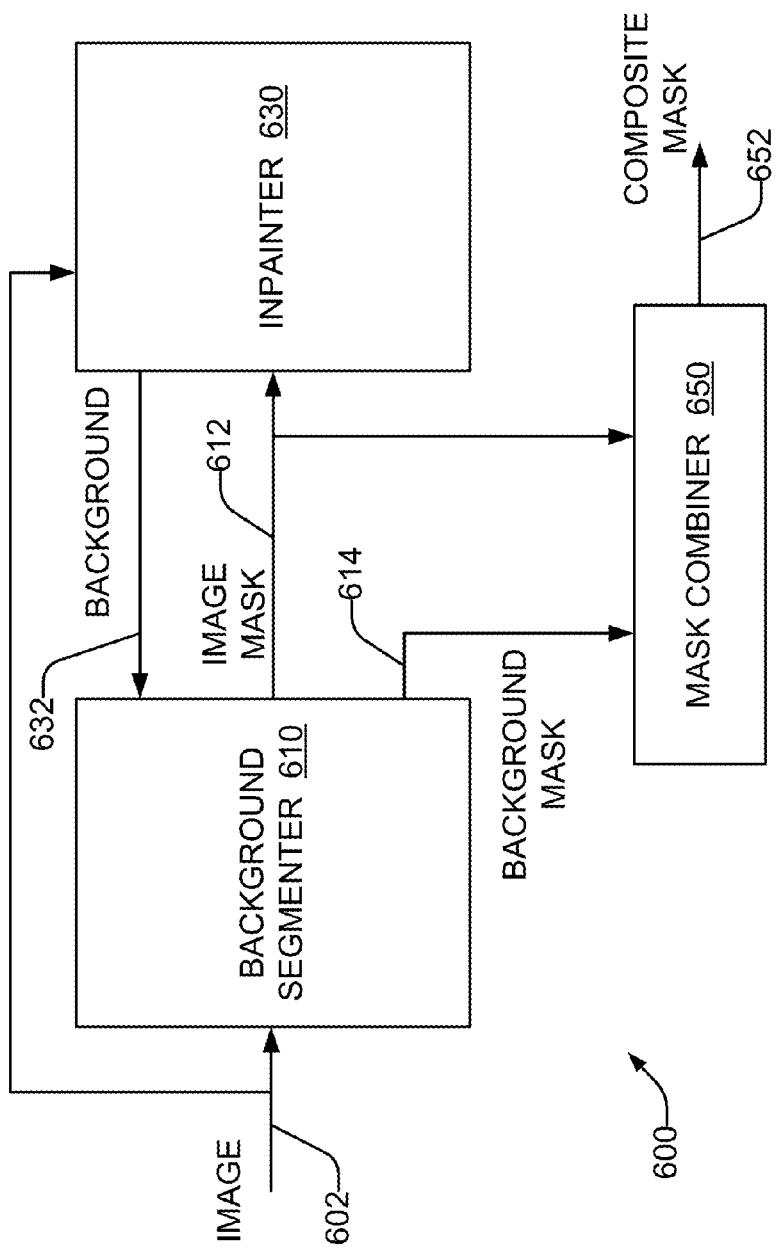
FIG. 6 is a schematic representation of a digital image enhancement device according to an example of the present disclosure.

Considering now a digital image enhancement device, and with reference to FIG. 6, a device 600 receives an image 602 and generates a composite mask 652. In examples, the device 600 operates according to some or all of one or more of the methods 100-500 of FIGS. 1-5. The device 600 includes a background segmenter 610, an inpainter 630, and a mask combiner 650.

The background segmenter 610 receives the image 602, identifies background and non-background regions of the image 602, and forms an image mask 612.

The inpainter 630 receives the image 602, and receives the image mask 612 from the background segmenter 610. The inpainter 630 forms a background 632 of the working image 602 by filling the non-background regions of the working image 602 based on the image mask 612. The background 632 is provided to the background segmenter 610, which identifies background and non-background regions of the background 632, and forms a background mask 614.

The mask combiner 650 merges the image mask 612 and the background mask 614 into a composite mask 652. The composite mask 652 is usable to preserve smooth-boundaried foreground objects of the image 602 during operations which enhance the image 602.

In some examples, the background segmenter 610, inpainter 630, and/or mask combiner 650 include an upscaler and/or a downscaler (not shown) to implement the various upscaling and downscaling operations discussed heretofore with reference to FIGS. 2 and 5.

Various ones of FIGS. 9A-9I illustrate an example of the operation of the device 600. The example image 900 (FIG. 9A) corresponds to the image 602. The example mask 910 (FIG. 9B) corresponds to the image mask 612. The example background image 920 (FIG. 9C) corresponds to the background 632. The example background mask 950 (FIG. 9F) corresponds to the background mask 614. The example composite background mask 960 (FIG. 9G) corresponds to the composite mask 652.

Figure 7:
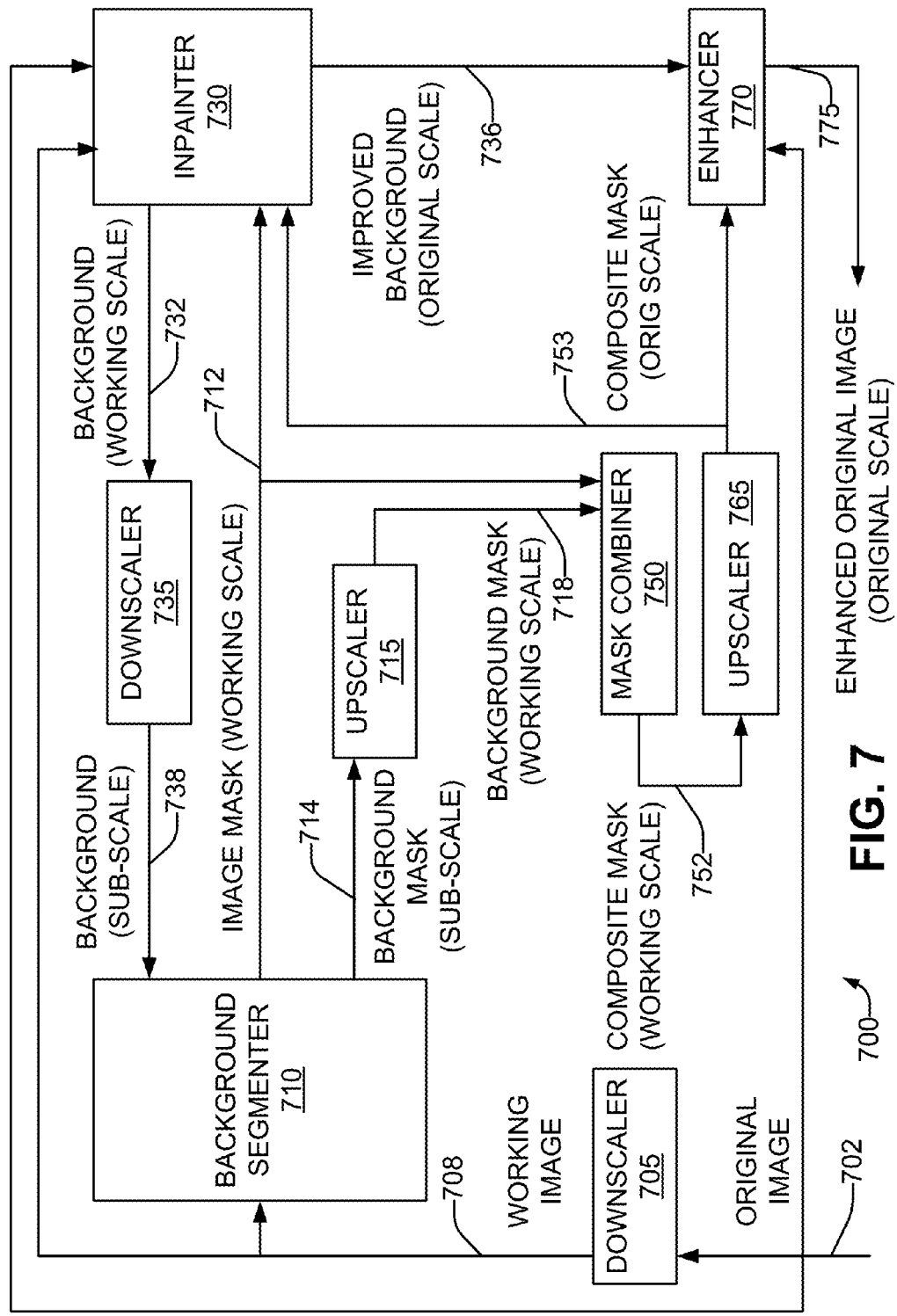
FIG. 7 is a schematic representation of another digital image enhancement device according to an example of the present disclosure.

Considering now another digital image enhancement device, and with reference to FIG. 7, a device 700 receives an original image 702 and generates an enhanced original image 775. In examples, the device 700 operates according to some or all of one or more of the methods 100-500 of FIGS. 1-5. The device 700 includes a background segmenter 710, an inpainter 730, and a mask combiner 750. The device 700 also includes upscalers 715, 765 and downscalers 705, 735. The upscalers 715, 765 may be the same upscaler or two different upscalers, and the downscalers 705, 735 may be the same downscaler or two different downscalers. In other examples, various ones of the upscalers and downscalers are disposed in various ones of the background segmenter 710, inpainter 730, and/or mask combiner 750.

The downscaler 705 receives the original image 702, and downscales the original image 702 from an original size (original scale) to form a working image 708 of a smaller size (working scale).

The background segmenter 710 receives the working image 708, identifies background and non-background regions of the working image 708, and forms an image mask 712, at the working scale, which indicates the background and non-background regions of the working image 708.

The inpainter 730 receives the working image 708, and receives the image mask 712 from the background segmenter 710. The inpainter 730 forms a background 732, at the working scale, of the working image 708 by filling the non-background regions of the working image 708 based on the image mask 712. The background 732 is downscaled to form a downscaled background 738, at a sub-scale. The downscaled background 738 is provided to the background segmenter 710.

The background segmenter 710 further receives the downscaled background 738, identifies background and non-background regions of the downscaled background 738, and forms a downscaled background mask 714, at the sub-scale, which indicates the background and non-background regions of the downscaled background 738. The upscaler 715 receives the downscaled background mask 714 and upscales it to form a background mask 718 at the working scale.

The mask combiner 750 receives the image mask 712 and the background mask 718, and merges the masks 712, 718 into a composite background mask 752 at the working scale. The upscaler 765 receives the composite mask 752 at the working scale and upscales it to form a composite background mask 753 at the original scale.

The inpainter 730 further receives the composite background mask 753 at the original scale from the mask combiner 750. The inpainter 730 forms a more accurate background 736 of the working image 708, at the original scale, by filling the non-background regions of the original image 702 based on the composite mask 753. The background 736 more accurately omits foreground objects than does the background 732.

The more accurate background 736, the composite background mask 753, and the original image 702 are received by the image enhancer 770. The background 736, mask 753, and image 702 are all at the original scale. The image enhancer 770 adjusts and/or corrects the original image 702, using at least one of the more accurate background 736 and the composite background mask 753 to form an enhanced original image 775.

Various ones of FIGS. 9A-9I illustrate an example of the operation of the device 700. The content of the example image 900 (FIG. 9A) corresponds to that of both the original image 702 at the original scale, and the working image 708 at the working scale; the content is identical, but at different scales The example mask 910 (FIG. 9B) corresponds to the image mask 712 at the working scale. The example background image 920 (FIG. 9C) corresponds to the background 732 at the working scale. The example background image 930 (FIG. 9D) corresponds to the downscaled background 738 at the sub-scale. The example downscaled background mask 940 (FIG. 9E) corresponds to the downscaled background mask 714 at the sub-scale. The example background mask 950 (FIG. 9F) corresponds to the upscaled background mask 718 at the working scale. The content of the example composite background mask 960 (FIG. 9G) corresponds to that of both the composite mask 752 at the working scale, and the composite mask 753 at the original scale. The example more accurate background 970 (FIG. 9H) corresponds to the more accurate background 736 at the original scale. The example enhanced original image 980 (FIG. 9I) corresponds to the enhanced original image 775 at the original scale.

Figure 8:
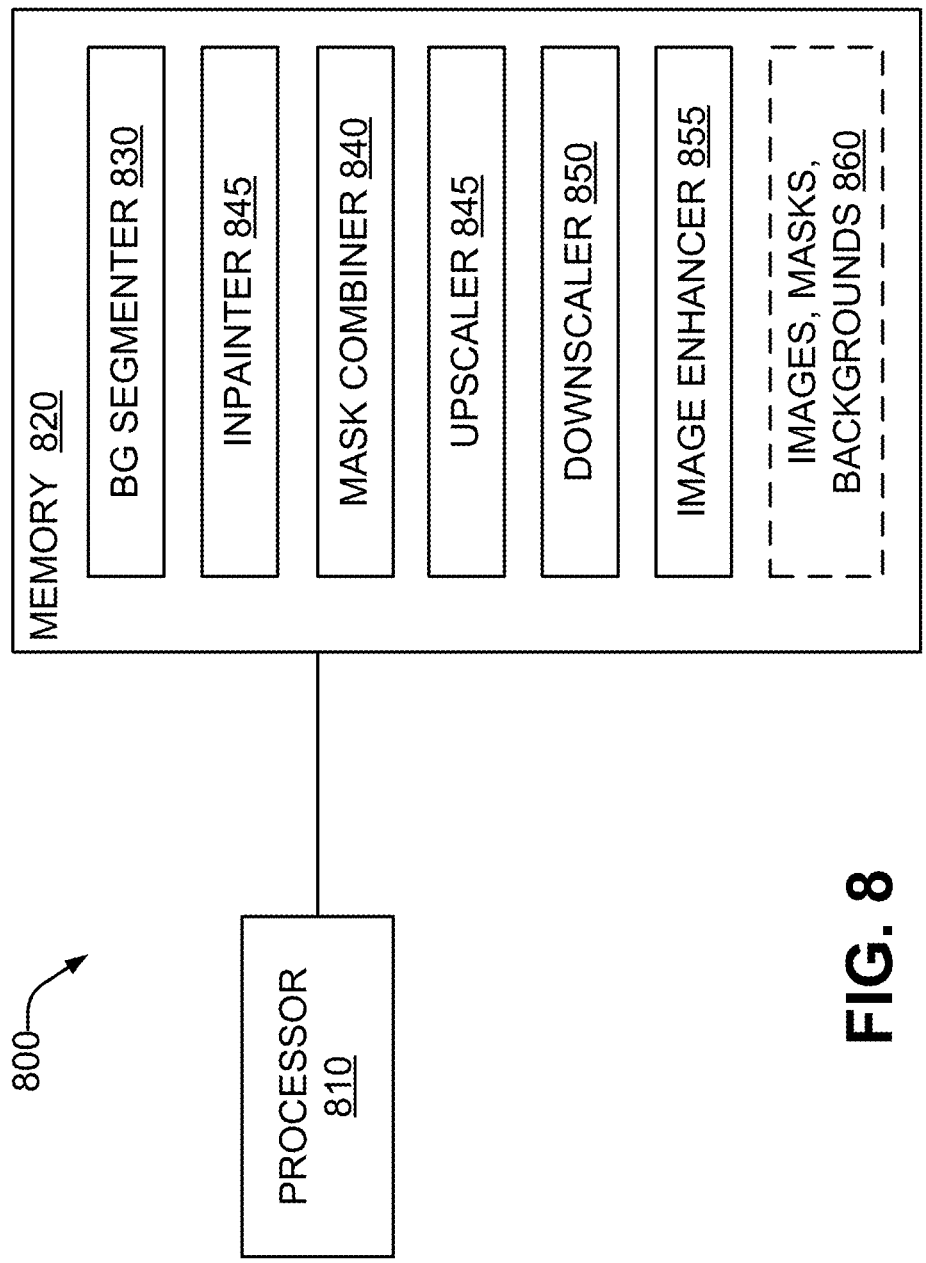
FIG. 8 is a schematic representation of a processor-based digital image enhancement device according to an example of the present disclosure.

The devices 600, 700 may be implemented in hardware, firmware, software, or a combination of these. In a hardware implementation of the device 600, 700, the various blocks of these devices may be a combination of analog circuitry, digital circuitry, ASICs, DSPs, programmable logic devices, gate arrays, and/or other types of electronic circuits. In examples where a device is implemented in whole or in part in firmware or software, and as understood with reference to FIG. 8, a device 800 includes a memory 820 having machine-readable firmware or software instructions that implement at least one of the blocks of the device 800, and a processor 810 which is communicatively coupled to the memory 820 to access and execute the instructions. In one example, the memory 820 includes instructions, executable by the processor 810, of a background segmenter 830, an inpainter 835, a mask combiner 840, an upscaler 845, a downscaler 850, and an image enhancer 855. As such, the device 800 is not a general-purpose computer but rather is specifically programmed to perform the particular image processing operations of the methods 100-500 of FIGS. 1-5. The memory 820 may also store data 860 which represents the images, backgrounds, and masks which are received or generated by the device 800.

The memory 820 is at least one computer-readable or computer-usable storage medium. The storage medium may include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). The software or firmware instructions can be provided on one computer-readable or computer-usable storage medium, or alternatively, can be provided on multiple computer-readable or computer-usable storage media, which may be disposed at a single or plural nodes of a system. Such computer-readable or computer-usable storage medium or media are considered to be part of an article of manufacture, which can refer to any manufactured single component or multiple components.

In some examples, at least one block or step discussed herein is automated. In other words, apparatus, systems, and methods occur automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

From the foregoing it will be appreciated that the devices, methods, and medium provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and different features or elements may be included in various combinations that may be claimed in this or a later application. Unless otherwise specified, operations of a method claim need not be performed in the order specified. Similarly, blocks in diagrams or numbers should not be construed as operations that proceed in a particular order. Additional blocks/operations may be added, some blocks/operations removed, or the order of the blocks/operations altered and still be within the scope of the disclosed examples. Further, methods or operations discussed within different figures can be added to or exchanged with methods or operations in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of at least one such element, neither requiring nor excluding two or more such elements. Where the claims recite "having", the term should be understood to mean "comprising".

What is claimed is:

1. A method of automatically enhancing a digital image having a smooth-boundaried foreground object, comprising:
processing the image via gradient-based background segmentation at a first scale to generate a first mask, having a first accuracy, used to generate a first background of the image which includes at least a portion of the smooth-boundaried foreground object;
processing the first background via gradient-based background segmentation at a smaller second scale to generate a second mask, having a greater second accuracy, used with the first mask to generate a second background of the image which substantially excludes the smooth-boundaried foreground object;

enhancing the image using the second background so as to preserve the smooth-boundaried foreground object; and outputting the enhanced image.

2. The method of claim 1, wherein processing the image comprises:

segmenting the image to form the first mask, at the first scale, identifying background and non-background regions of the image with the first accuracy;

forming the first background by inpainting the non-background regions of the image identified by the first mask based on a background region of the image identified by the first mask.

3. The method of claim 2, wherein segmenting the image comprises:

determining gradient magnitude values of pixels of the image;

determining a first global threshold from the gradient magnitude values;

thresholding the gradient magnitude values using the first global threshold to form thresholded gradient magnitude values;

assigning the pixels to groups based on a watershed transform of the thresholded gradient magnitude values; and denoting each group as a background region or a non-background region based on at least one characteristic of the corresponding group.

4. The method of claim 1, wherein processing the first background comprises:

downscaling the first background to the smaller second scale;

segmenting the downscaled first background to form a second mask, at the second scale, identifying background and non-background regions of the downscaled first background;

upscaling the second mask to the first scale;

combining the upscaled second mask with the first mask to form a composite mask which locates the smooth-boundaried foreground object with the greater second accuracy; and forming the second background by inpainting the non-background regions of the image identified by the composite mask based on a background region of the image.

5. The method of claim 4, wherein the combining comprises:

defining as a background region of the composite mask the background region of the first mask and the background region of the upscaled second mask; and defining portions of the composite mask other than the background region as non-background regions of the composite mask.

6. The method of claim 4, wherein segmenting the downscaled first background comprises:

determining gradient magnitude values of pixels of the downscaled first background;

determining a second global threshold from the gradient magnitude values;

reducing the second global threshold by a predetermined factor;

thresholding the gradient magnitude values using the reduced second global threshold to form thresholded gradient magnitude values;

assigning the pixels to groups based on a watershed transform of the thresholded gradient magnitude values; and denoting the groups as background regions or non-background regions based on at least one characteristic of the corresponding group.

7. The method of claim 4, comprising:

upscaling the second background to a scale of an original version of the image;

deriving spatially-variant gains for each pixel of the original version from the upscaled second background; and applying the spatially-variant gains to each pixel of the original version so as to form an enhanced original version that corrects for color cast and uneven illumination in the original version.

8. The method of claim 7, comprising:

upscaling the composite mask to a scale of the original version of the image; and sharpening portions of the enhanced original version that correspond to non-background regions defined by the upscaled composite mask.

9. The method of claim 1, wherein an original version of the image is a digital photograph of a book page acquired by a camera, the original version downscaled to form the image, the image having a predefined largest dimension.

* * * * *